Sept. 25, 1934.     C. L. HAMM     1,974,989
CAPACITOR MOTOR
Filed Aug. 22, 1933

Inventor:
Clarence L. Hamm,
by Harry E. Dunham
His Attorney.

Patented Sept. 25, 1934

1,974,989

UNITED STATES PATENT OFFICE 1,974,989

CAPACITOR MOTOR

Clarence L. Hamm, Marblehead, Mass., assignor to General Electric Company, a corporation of New York Application August 22, 1933, Serial No. 686,230

8 Claims. (Cl. 172—279)

My invention relates to single-phase capacitor motors and its primary object is to obtain increased starting torque and increased capacitance effect at starting without resorting to external voltage-changing apparatus. A further object is to provide such a motor in which the same condenser is used for starting and running, but in which the voltage across the starting winding circuit is materially reduced between starting and running conditions without resorting to an external voltage-changing transformer or the like. In carrying my invention into effect, I use the main winding as a variable reactance to increase the main winding flux at start and as an adjustable auto-transformer to increase the voltage across the starting winding circuit at start.

Figure 1:
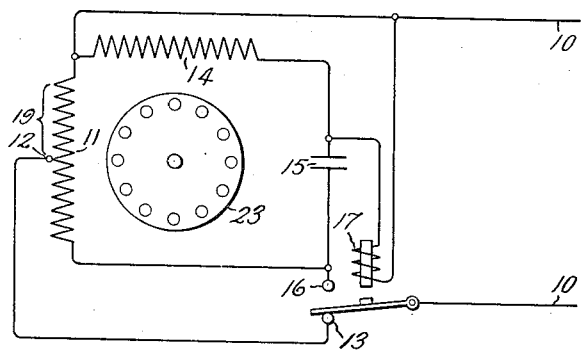
Figure 2:
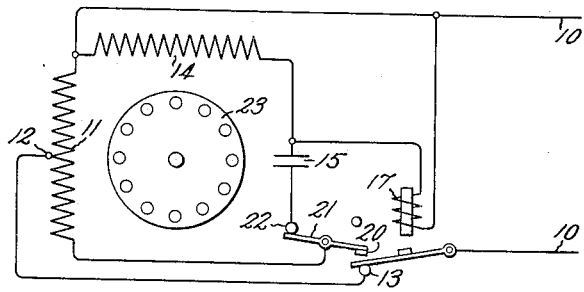

The features of my invention which are believed to be novel and patentable will be pointed out in the claims appended hereto. For a better understanding of my invention reference is made in the following description to the accompanying drawing showing in Fig. 1 a preferred embodiment of my invention where the condenser is used during running, and Fig. 2 represents an arrangement which gives the same starting conditions as in Fig. 1, but where the condenser is not used for running.

Referring to the drawing, I have represented a single-phase condenser motor connected to a source of supply 10. The main winding 11 has an intermediate tap 12 connected to the lower contact 13 of an automatic switch, the movable switch blade of which is connected to one side of the source of supply 10. 14 indicates the starting winding disposed at a suitable angle to the main winding and which is connected in series with a condenser 15 in parallel with the main winding. The other line terminal is connected to the common terminal of the main and starting windings; the upper contact 16 of the automatic switch is connected between the condenser 15 and opposite end of the main winding. The usual form of squirrel-cage rotor is indicated at 23.

In this case the automatic switch is operated by a relay, the winding 17 of which is connected across the starting winding 14 and is therefore responsive to the increase in voltage across this winding which usually occurs as this type of motor comes up to speed from stand-still. However, I do not confine my invention to this particular type of automatic switch. The switch is represented in the starting position with the movable switch blade on the lower contact 13, in which condition it will be evident that the main winding 11 of the motor acts as an auto-transformer to boost the voltage across the starting winding circuit to a value materially higher than line voltage. A high voltage therefore exists across the condenser 15 under these conditions, and a high capacitance effect for high torque starting is obtained. At the same time the section 19 of the main winding is connected directly across the line greatly increasing the main winding flux over that which could be expected if the same voltage was applied across the entire winding. The section 19 of the main winding may be made of heavier wire than the remaining section if desired.

As the motor speeds up, the voltage across the starting winding further increases due to the increased transformer action between the main and starting windings and the relay coil 17 is so adjusted to move the switch from contact 13 to 16 to change to running conditions at the desired speed. When the switch operates, the motor becomes connected as a normal single-phase capacitor motor with the starting winding circuit including the condenser in parallel with the entire main winding 11. The voltage across the starting winding circuit is decreased to line voltage thereby reducing the component of line voltage across the condenser and reducing the capacitance effect to a value suitable for high power factor running. The line voltage now is applied across the entire main winding and the flux thereof is reduced to a value consistent with normal running conditions. The voltage across the starting winding and therefore across relay coil 17 is reduced when the automatic switch operates because at this instant the component of line voltage across the starting winding is reduced. The relay voltage under running conditions therefore is somewhat less than that which exists just prior to the operation of the switch, but is ample to hold the switch in the running position after operating. This prevents an undue expenditure of energy in the relay coil and conditions it to drop out promptly should the motor voltage or speed decrease abnormally, making it desirable to change back to the starting connection. Such a motor gives high starting torque and increased capacitance volts at start with the use of an ordinary condenser suitable for power factor correction during running and without using an external tap changing transformer or the like.

If it is desired to cut the starting winding out of circuit for running, the switching arrangement of Fig. 2 may be used. In this case, the contact 13 and the movable switch blade connected to the line is the same as before. However, the upper contact 20 corresponding to contact 16 in Fig. 1, is mounted on a pivoted switch blade 21 biased to the position shown to obtain the same starting connection as in Fig. 1. This movable switch blade is connected permanently to the outer end of the main winding 11 and connected temporarily to the condenser 15 through a stationary back contact 22, such that when the line blade is operated by the coil 17, the blade 21 is turned to open the connection to the condenser and starting winding circuit. It may be noted that by this arrangement the voltage across the starting winding circuit is reduced to line voltage when the relay-operated contact member first contacts with 20 just before the contact at 22 is opened, thereby reducing the arcing condition at contact 22 to a negligible value immediately before it does open.

In Fig. 2, even though the condenser is not used during running, nevertheless high torque starting is obtained by reason of the high main winding flux and the increased capacitance voltage at start without the use of external voltage changing apparatus.

What I claim as new and desire to secure by Letters Patent of the United States, is:

1. A single-phase motor having main and starting windings disposed at an angle to each other, a condenser in series with the starting winding and the starting winding circuit thus formed being connected in parallel to the main winding, a single-phase source of supply having one side connected to one end of both windings and an automatic switch responsive to the speed of the motor for connecting the other side of said source to an intermediate point in the main winding at start and to the condenser-connected end of the main winding for normal operation.

2. A single-phase condenser motor having main and starting windings disposed at an angle to each other, a condenser connected in series with the starting winding and the starting winding circuit thus formed being connected in parallel with the main winding, a single-phase source of supply having one side connected to one end of both windings, a switch connected to the other side of said source, said switch having a contact connected to an intermediate tap on the main winding and a contact connected to the condenser end of the main winding, and means responsive to the speed of the motor for operating said switch for changing the line connection thereof from the first-mentioned contact to the last-mentioned contact between starting and running conditions.

3. A single-phase condenser motor having main and starting windings disposed at an angle to each other, a condenser in series with the starting winding, said starting winding circuit being connected in parallel to the entire main winding, a constant voltage source of supply, a switch for connecting only a portion of the main winding across said source of supply at start, and for connecting the entire main winding across the source for normal operation, the main winding being used as a step-up autotransformer for supplying the starting winding circuit during starting, and a relay responsive to the voltage across the starting winding circuit for automatically operating said switch as the motor comes up to speed.

4. The method of starting a single-phase condenser motor having main and condenser starting winding circuits from a constant voltage source of supply which consists in energizing only a portion of the main winding from the source of supply and energizing the condenser starting winding circuit from the main winding used as a step-up autotransformer at start and energizing the entire main winding from the source of supply as the motor approaches normal speed.

5. The method of starting and operating a single phase condenser motor having main and condenser starting winding circuits from a constant voltage source of supply which consists in energizing only a portion of the main winding from the source of supply and the starting winding circuit from the main winding used as a step-up autotransformer at start and energizing the entire main winding and the starting winding circuit in parallel from the source of supply for normal operation.

6. The method of starting a single-phase condenser motor having main and condenser starting winding circuits from a constant voltage source of supply which consists in energizing only a portion of the main winding from the source and the starting winding circuit from the main winding used as a step-up autotransformer at start, energizing the entire main winding from the source of supply and simultaneously reducing the voltage across the starting winding circuit to the source voltage as the motor approaches normal speed.

7. The method of starting and operating a single-phase condenser motor having main and condenser starting winding circuits from a constant source of supply which consists in energizing only a portion of the main winding from the source and energizing the starting winding circuit from the main winding used as a step-up autotransformer at start, energizing the entire main winding from the source and simultaneously reducing the voltage across the starting winding circuit to the voltage of said source as the motor approaches normal speed and immediately thereafter opening the starting winding circuit for normal operation.

8. A single-phase condenser motor having main and starting windings disposed at an angle to each other, a condenser connected in series with the starting winding, a constant voltage source of supply, a switching device for connecting only a portion of the main winding across said source and the entire main winding in parallel to the starting winding circuit at start and for connecting the entire main winding across said source and opening the starting winding circuit for normal operation, and a relay responsive to the voltage across the starting winding for automatically operating said switching device as the motor comes up to speed.

CLARENCE L. HAMM.